United States Patent
Alviti

(10) Patent No.: US 6,620,317 B2
(45) Date of Patent: Sep. 16, 2003

(54) WASTE WATER TREATMENT SYSTEM

(75) Inventor: Steven R. Alviti, Saunderstown, RI (US)

(73) Assignee: Bel Air Finishing Supply Corp., Warwick, RI (US)

( * ) Notice: Subject to any disclaimer, the term of this patent is extended or adjusted under 35 U.S.C. 154(b) by 185 days.

(21) Appl. No.: 09/950,970

(22) Filed: Sep. 12, 2001

(65) Prior Publication Data

US 2003/0047516 A1 Mar. 13, 2003

(51) Int. Cl.$^7$ ................................................. C02F 1/52
(52) U.S. Cl. ........................ 210/205; 210/206; 210/208; 222/195; 239/311; 239/314; 366/101; 366/128; 366/113; 366/165.1
(58) Field of Search ................................. 210/738, 205, 210/206, 207, 208, 748; 222/195; 239/311, 314; 366/101, 113, 128, 165.1

(56) References Cited

U.S. PATENT DOCUMENTS

| | | | | |
|---|---|---|---|---|
| 3,819,157 A | * | 6/1974 | Markfelt | 366/101 |
| 3,893,921 A | * | 7/1975 | Walther et al. | 210/206 |
| 3,933,642 A | * | 1/1976 | Wilson | 210/206 |
| 4,086,663 A | * | 4/1978 | Croft | 366/137.1 |
| 4,100,614 A | * | 7/1978 | Mandt | 366/154.1 |
| 4,430,001 A | * | 2/1984 | Schurr | 366/107 |
| 4,498,986 A | * | 2/1985 | Temme et al. | 210/199 |
| 4,536,286 A | | 8/1985 | Nugent | 210/202 |
| 4,643,582 A | * | 2/1987 | Ricciardi | 366/102 |
| 4,859,327 A | | 8/1989 | Cox et al. | 210/219 |
| 4,927,543 A | | 5/1990 | Bablon et al. | 210/711 |
| 5,120,436 A | * | 6/1992 | Reichner | 210/207 |
| 5,800,717 A | | 9/1998 | Ramsay et al. | 210/711 |
| 5,814,230 A | * | 9/1998 | Willis et al. | 210/710 |
| 5,948,258 A | * | 9/1999 | Daugherty | 210/513 |
| 5,993,659 A | | 11/1999 | Schenk | 210/618 |
| 5,993,668 A | * | 11/1999 | Duan | 210/713 |
| 6,079,911 A | * | 6/2000 | Wangermann et al. | 406/132 |

* cited by examiner

Primary Examiner—Peter A. Hruskoci
(74) Attorney, Agent, or Firm—Barlow, Josephs & Holmes, Ltd.

(57) ABSTRACT

A system for treating waste water includes a dry-feed hopper and a wetting flume for receipt of dry flocculant and waste water. The dry-feed hopper includes a container with a volume of dry flocculant therein. A manifold receives a nozzle connected to an air source to periodically deliver dry flocculant to the wetting flume. An inline static mixer is provided after the wetting flume. The output of the inline static mixer is introduced into an agitation stage via a constricting nozzle which includes a base support and a cylindrical housing with an outer wall and an, inner wall and is resiliently mounted to the top surface of said base support. A downward spiraling length of corrugated hose is positioned between the outer wall and the inner wall. Waste water from the inline static mixer is introducing into the top entry port of the length of corrugated hose to exit at the bottom exit port of the corrugated hose. The, cylindrical housing and corrugated hose is vibrated during flow of waste water therethrough to encourage the development of large flocs to provide treated waste water suitable for further dewatering and filtering.

5 Claims, 3 Drawing Sheets

WASTE WATER TREATMENT SYSTEM

BACKGROUND OF THE INVENTION

The present invention relates generally to waste water from effluent sources such as those generated by chemical manufacturing, food processing, machining, deburring operations, aqueous cleaning and mining. More specifically, the present invention relates to apparatuses and systems for treating such waste water for proper disposal and/or reuse.

Various processes are employed to treat sewage, as well as water for drinking. Some employ very large and complex pieces of equipment, and are utilized in situations involving significant volumes of effluent to be treated. Other processes are accomplished on a much smaller scale. Plants employing small scale treatment processes are often referred to as "package plants", due to the ability to package and ship an entire plant as a unit. In sewage treatment, such plants are used to treat a single residential subdivision or single commercial application without the necessity of transmitting sewage to a large central treatment site. The same is true in water treatment, where small water systems cannot justify large treatment operations.

Also, sedimentation devices which incorporate settling tanks are well known to separate suspended solids from streams of liquid, such as water and wastewater, by gravitational settling. To increase the effectiveness of the liquid-solid separation it is well known to employ various chemical flocculating agents (e.g., polyelectrolytes) or coagulating agents (e.g. mineral salts). When mixed with the effluent, the agents combine with suspended solids to form rapidly settlable aggregates, called flocs.

It is also known that settling of floc particles can be enhanced in certain circumstances by mixing the flocculating agents with inert particles such as clay and sand. The mixing of flocculating agents and inert particles with the effluent is accomplished outside the sedimentation (or settling) tank in a pipe or mixing chamber and, may be accompanied by mechanical stirring of the mixture to provide contact opportunity and time for the resulting flocs to grow.

It is known to use such recirculation and mixing of impurities for floc growth until the flocs attain a size sufficient to settle or for easy removal by further filtration. But there are still short-comings (such as long treatment times, costs, etc.) in the prior art devices that utilize the addition of chemical flocculating agents and sometimes inert particles or that utilize recirculation of impurities to produce flocs.

For example, a common package sewage treatment plant employees a circular tank containing aeration equipment. Effluent sewage is aerated in the tank. In a settling chamber, aerated floc is allowed to settle out and is returned to the tank, usually by pumping. Clarified water is skimmed from the settling chamber and is removed from the tank by either gravity flow or pumping.

In a package water treatment plant, the process is similar. Untreated water is pumped into a circular tank where a flocculant is added, causing solid particles in the water to coalesce. The water is mixed to encourage full utilization of the flocculant. In a settling chamber, the floc is allowed to settle and clarified water is skimmed and removed.

The efficiency of package sewage treatment plants has been questioned, as has the energy consumption of such plants. With increasing effluent quality standards, a need has developed for a more efficient plant which will function adequately under peak loading conditions while consuming a minimum amount of energy.

Various types of aerobic treatment methods are employed in large scale sewage treatment plants. One method which has proven to be highly successful utilizes an oxidation ditch for sewage aeration, whereby a flow of aerated sewage is continuously circulated in a generally oval-shaped ditch. Clarification of the aerated sewage is accomplished in various ways. Some plants use external clarifiers, which are large tanks into which mixed liquor from the oxidation ditch is pumped. Sludge floc is allowed to settle and is pumped back into the ditch for further aeration. Clarified effluent is drawn off the top of the external clarifier or passing through finishing or polishing filters. The external clarifier process is very similar to that used in the prior art package plants.

In view of the foregoing, there is a demand for a water treatment system that can continuously treat waste water. Further, there is a demand for a water treatment system is this compact and inexpensive to manufacture and use while being highly efficient. Moreover, there is a demand for a water treatment system that can be easily installed inline with preexisting filtration equipment.

SUMMARY OF THE INVENTION

The present invention preserves the advantages of prior art waste water treatment systems. In addition, it provides new advantages not found in currently available systems and overcomes many disadvantages of such currently available systems.

The invention is generally directed to the novel and unique waste water treatment system with particular application in continuously treating a flow of contaminated, waste or bilge water from a source, such as, for example, chemical processing effluent, jewelry manufacturing and plating, machine shops, food processing effluent or mining effluent.

The waste water treatment system of the present invention includes a dry-feed hopper and a wetting flume for receipt of dry flocculant and waste water. The dry-feed hopper includes a container with a volume of dry flocculent therein. A manifold receives a nozzle connected to an air source to periodically deliver dry flocculant to the wetting flume. An inline static mixer is provided after the wetting flume. The output of the inline static mixer is introduced into an agitation stage which includes a base table support and a cylindrical housing with an outer wall and an inner wall and is resiliently mounted to the top surface of said base table support. A downward spiraling length of corrugated hose is positioned between the outer wall and the inner wall. Waste water from the inline static mixer is introducing into the top entry port of the length of corrugated hose to exit at the bottom exit port of the corrugated hose. The cylindrical housing and corrugated hose is vibrated during flow of waste water therethrough to encourage the development of flocs to provide treated waste water suitable for further dewatering and filtering.

In operation, "contaminated" or "waste" water is controllably introduced into a wetting flume where dry flocculant is periodically introduced into the flow of waste water. The waste water is then passed through an inline static mixer where further mixing of the flocculant is achieved. The output of the inline static mixer is passed into a vibrating downward spiral of corrugated hose. Through the assistance of gravity and the agitation by use of a motor driven vibrating table, desirable flocs are produced and enlarged to treat the waste water in preparation of further dewatering and by conventional filtration systems.

It is therefore an object of the present to provide a waste water treatment system that can treat a continuous flow of effluent.

Another object of the present invention is to provide a waste water treatment system that is inexpensive and easy to install, manufacture and use.

It is a further object of the present invention to provide a waste water treatment system that is easily installable inline with other filtration devices.

It is a further object of the present invention to provide a waste water treatment system that is compact yet highly efficient.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
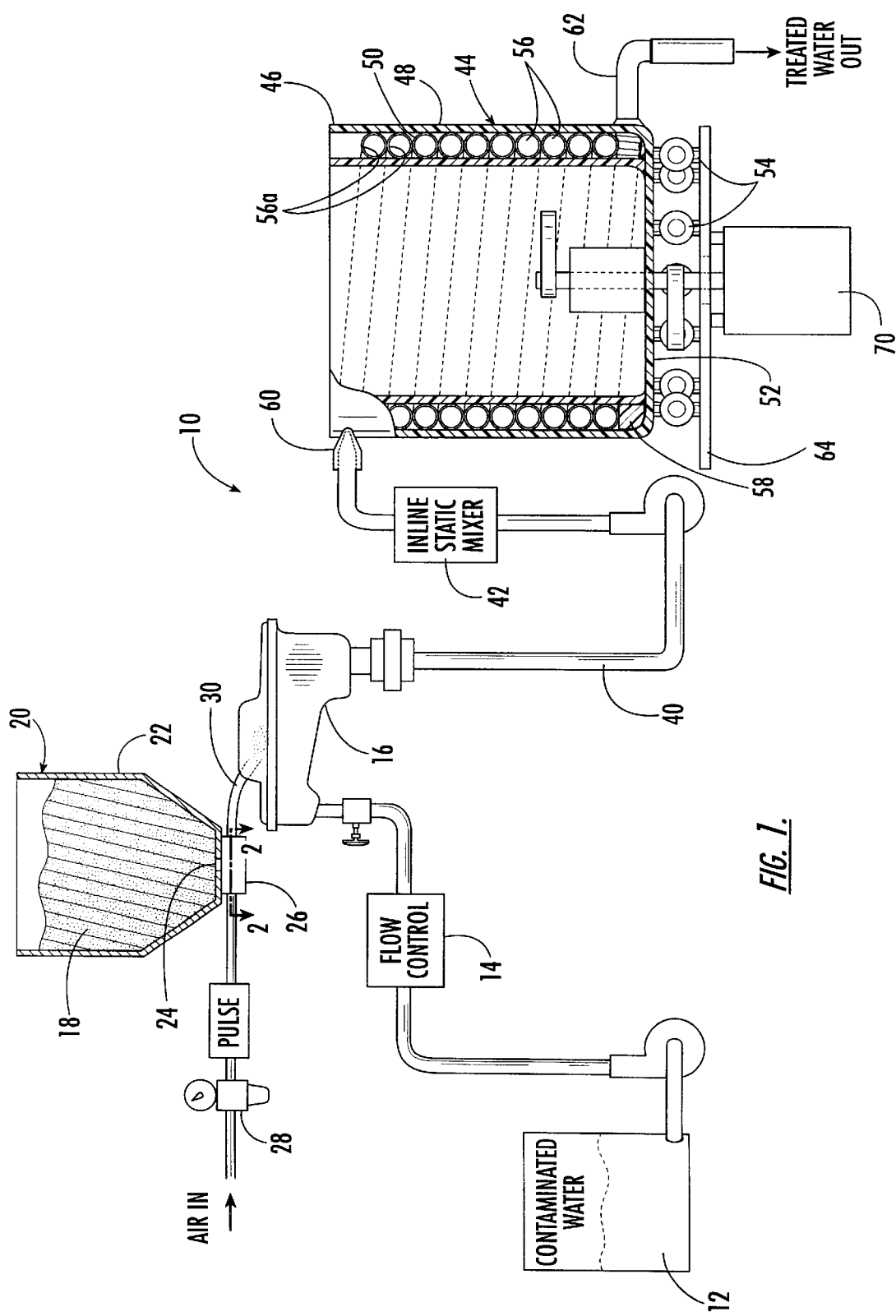
FIG. 1 is a side elevational view, partially in cross-section, of the waste water treatment system in accordance with the present invention.

Referring first to FIG. 1, a side elevational view, partially in cross-section, of the waste water system 10, in accordance with the present invention, is shown. The present invention provides for continuous treatment of waste water as opposed to batch processing commonly done in the prior art. In that connection, a continuous supply of contaminated waste water 12 is provided as a by-product from a manufacturing process, such as chemical manufacturing, food processing or mining, for example. Any contaminated waste water source 12 may be treated by the system of the present invention.

Still referring to FIG. 1, the continuous supply of waste water 12 is controlled by a flow control valve 14. The output flow from the control valve 14 is supplied directly to a covered wetting flume 16 which serves to periodically introduce dry flocculent 18 into the contaminated waste water stream 12 from a flocculant hopper apparatus 20 with a V-shaped floor. This flocculent hopper 20 includes a container 22 which contains a volume of dry flocculent 18. An aperture 24 at the bottom of the container 22 interfaces with a hopper manifold 26 to introduce the dry flocculent 18 into the waste water stream. Pulsed air, from an air source is controllably forced, by valve 28, into the hopper manifold 26 to urge small volumes of dry flocculent 18 out from the manifold 26 via the hopper manifold exit conduit 30. The periodic bursts of dry flocculant 18 are injected into the covered water flume 16 that receives the flow of waste water 12.

Figure 2:
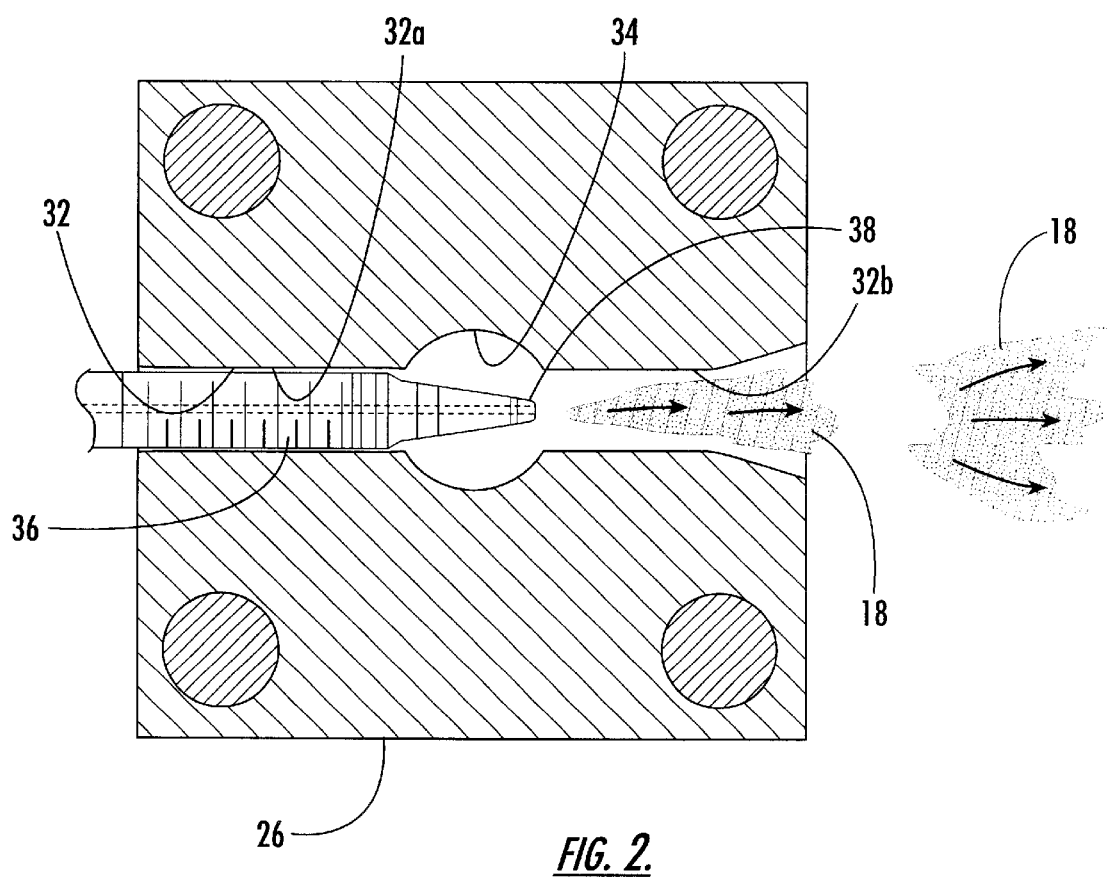
FIG. 2 is a cross-sectional view through the line 2—2 of FIG. 1 illustrating the flocculant dry-feed apparatus of the waste water treatment system in accordance with the present invention.

Details of the construction of the hopper manifold 26 are shown in FIG. 2. The hopper manifold 26 includes a transverse bore 32 and a vertical bore 34 which communicates with the aperture 24 at the bottom of the container 22. A nozzle 36 for the pulsed air is threadably received in the left portion 32a of the transverse bore 32 and the tip 38 of the nozzle 36 is, preferably positioned substantially within the vertical bore 34. Dry flocculant 18, by gravity, is fed down through the vertical bore 34 of the hopper manifold 26 to the junction of the vertical bore 34 and the transverse bore 32. Upon a burst of air from the nozzle 36, the volume of flocculant 18 residing with the junction of the vertical bore 34 and the transverse bore 32 is ejected completely out of the hopper manifold 26. This air across the filled chamber creates a vacuum which draws the dry blend of flocculent into the air stream via a vortex. After the pulse of air, the chamber at the junction of the vertical bore 34 and the transverse bore 32 will re-fill in preparation for another burst of air. As a result, a small volume of dry flocculant 18 is periodically introduced into the wetting flume 16, via the manifold exit conduit 30, for mixture into the stream of waste water 12 to be treated.

Referring back to FIG. 1, the output conduit 40 of the wetting flume 16 directs the mixes waste water 12 and flocculant 18 into an inline static mixer 42 which further combines and mixes the waste water 12 with the flocculent 18 to encourage the creation of flocs. This inline static mixer preferably includes a series of obstructions (not shown) within a solid tube that causes turbulence and aggressive mixing which is necessary for the flocculation to occur. At this point the gathering and flocculation of contaminants has begun. The output of the inline static mixer 42 supplies the partially treated waste water 12 to an agitation stage 44.

Figure 3:
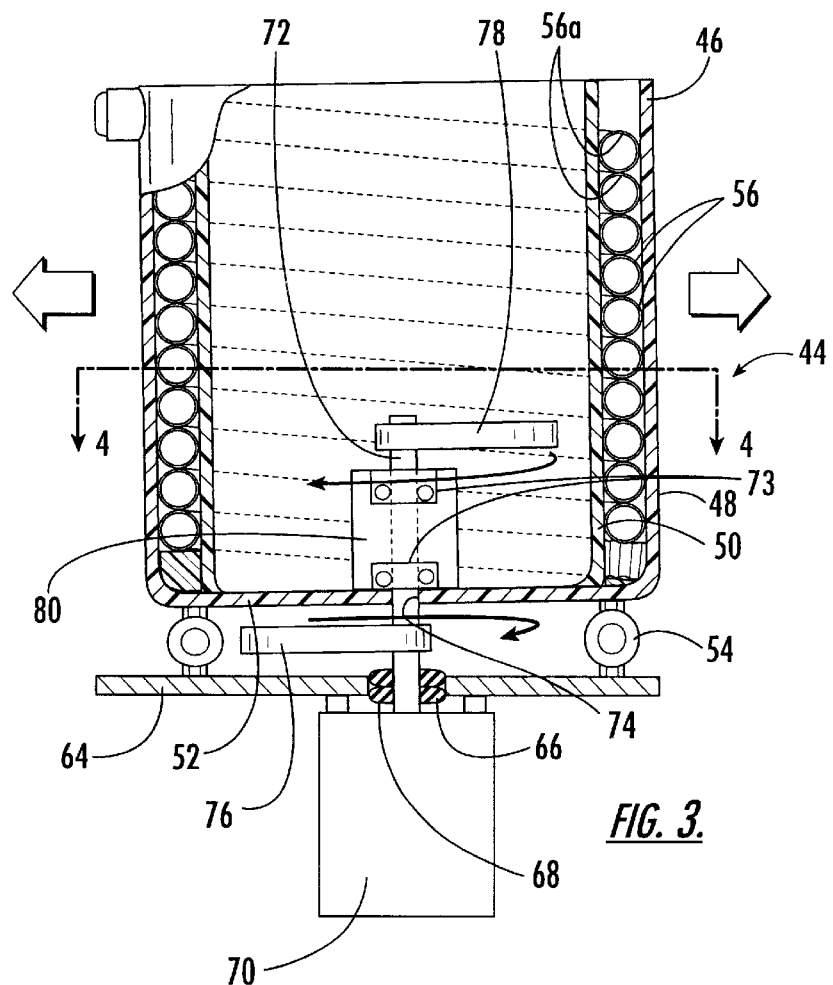
FIG. 3 is a side elevational view, partially in cross-section, of the agitation stage of the waste water treatment system in accordance with the present invention.
Figure 4:
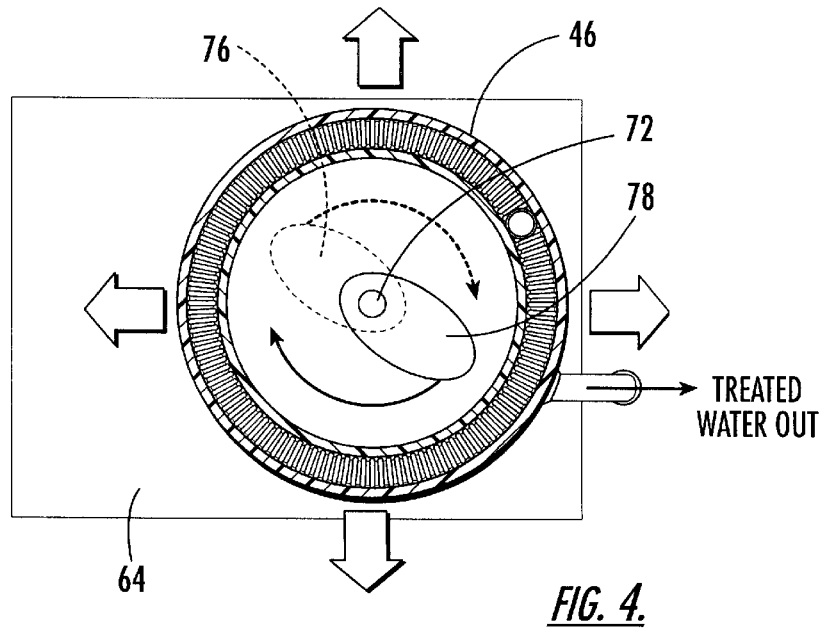
FIG. 4 is a cross-sectional view through the line 4—4 of FIG. 3 illustrating the vibratory mechanism of the agitation stage.

Referring now to FIGS. 1, 3 and 4, the agitation stage 44 is illustrated in detail. A substantially cylindrical housing 46 is provided with an outer wall 48 and an inner wall 50 and a floor 52. While a cylindrical housing is preferred, other configurations, such as a rectangular housing, may be employed. The housing 46 is resiliently mounted on a base support table by, preferably, rubber mounts 54. Springs may also be used for this purpose. A downward spiral or helix of corrugated hose 56 resides between the outer wall 48 and the inner wall 50 of the housing 46. A ramped spacer block 58 (partially shown) is employed to maintain a constant angle of decline of the hose 56 within the housing 46. A constricting nozzle 60 serves as an entry/feed port at the top of the housing 46 to interface with the top open end of the hose 56. The constricting nozzle 60 constricts the flow in a squeezing motion thus increasing the growth of the flocculant. An exit port 62 is provided at the bottom of the housing 46 to interface with the bottom open end of the hose to provide an exit to the overall waste water treatment system 10 of the present invention.

As the waste water 12 and flocculent 18 is passed through the agitation stage 44 it communicates with the substantially ribbed interior surfaces 56a of the corrugated hose 56 to further cause turbulence in the waste water 12 to encourage the formation of flocs. To further enhance the creation of flocs, vibration is also provided. Referring specifically to FIGS. 3 and 4, the housing 46 of the agitation stage 44 is resiliently mounted on a base table support 64 that includes an aperture 66 therethrough. A motor 70 is mounted to the bottom surface of the base table support 64. The axle 72 of motor 70 is routed through a aperture 66 in the base table support 64 and through the aperture 74 in the floor 52 of the housing 46 to provide a flexible coupling 68. A first offset weight 76 is fixedly mounted to the motor axle 72 at a position between the floor 52 of the housing 46 and the base support table 64. A second offset weight 78 is fixedly mounted to the motor axle 72 at a position above the floor 52 of housing 46. A mounting block 80 is also provided to maintain alignment of the axle 72 via bearing blocks 73. Preferably, the two offset weights 76, 78 are offset from the motor axle 72 approximately 120 degrees from one another; however, other arrangements and weight positions may be employed to the suit the application.

When the motor 70 is actuated and the axle 72 is rotated, the offset weights 76, 78 intentionally cause the rotation of the axle 72 to be out of alignment thus causing the axle 72 to wobble or vibrate in, for example, a toroidal pattern. This, in turn, causes the entire housing 46, and the corrugated hose 56 therein, to vibrate, roll and shake as shown by the arrows. This vibration can be controlled by the selection of the size, shape and positioning of first offset weight 76 and second offset weight 78.

The employment of a vibrating agitation stage 44 further enhances and encourages the growth of flocs within the waste water stream 12. The length of the hose 56 increases the time of travel of the liquid thus allowing for additional growth of flocculant. The output conduit 62 from the agitation stage 44 provides a continuous flow of treated waste water 12 that is suitable for further dewatering. This agitation stage completes the process of contaminant flocculation in the waste water 12 which results in a mixture of clean water and large flocculated particles of contaminants. As a result, large flocs are created which are easily removed using conventional dewatering and filtering methods using, for example, a filter press, filter paper, centrifuge, settling chamber, bag filter, and the like.

The following example illustrates the ability of the system of the present invention to treat waste water 12 by effectively and efficiently increasing the size of flocs for subsequent dewatering.

EXAMPLE

| | |
|---|---|
| Waste Water from tumbling operation | Plastic Media Breakdown and metal fines from tumble deburring operation Flow Rate: 2.5 gpm |
| Air Pulse | 20 psi, pulse every 3 seconds |
| Flocculant | Type: clay (Aquasafe brand) 1.5 lb/hr. |
| Size of flocs at output of system | Snowflake size |

As stated above, it is preferred that dry flocculant 18 be employed by the waste water treatment system 10 of the present invention. However, other flocculants or coagulant agents or combinations thereof may be used as well as other hopper and mixing apparatus to introduce the flocculant into the waste water stream. For example, a two-part flocculant system in accordance with the present invention may be employed. The corrugated hose 56 is preferably plastic but made by made of other suitable materials to address the application and type of waste water 12 at hand. Further, the offset weight arrangement is a preferred way to vibrate the housing 46 and hose 56 therein, other vibratory assemblies may be employed for this purpose.

It would be appreciated by those skilled in the art that various changes and modifications can be made to the illustrated embodiments without departing from the spirit of the present invention. All such modifications and changes are intended to be covered by the appended claims.

What is claimed is:

1. A waste water treatment system, comprising:
    a source of waste water to be treated;
    a dry-feed hopper;
    dry flocculent in said dry-feed hopper;
    a wetting flume having a waste water inlet, a flocculant inlet and a water flume outlet; said waste water being passing into said wetting flume via said waste water inlet; said dry flocculent being introduced into said wetting flume via said flocculent inlet;
    an inline static mixer, having an inlet and an outlet; said inlet of said inline static mixer being connected to said water flume outlet;
    a constricting nozzle connected to said outlet of said inline static mixer;
    an agitation stage including a downward helical arrangement of corrugated hose having an inlet and an outlet and means for vibrating said downward helical arrangement of corrugated hose; said inlet of said agitation stage being connected to said constricting nozzle, and
    whereby liquid exiting said outlet of said agitation stage is treated.

2. The waste water treatment system of claim 1, wherein said dry-feed hopper comprises:
    a container with a top open end and a bottom exit port;
    a volume of dry flocculant disposed in said container;
    a manifold, having a top surface, including a lateral bore extending therethrough and a longitudinal bore extending from said top surface into communication with said lateral bore; said lateral bore including a first portion and a second portion; said second portion of said longitudinal bore terminates in a manifold exit port;
    a nozzle, having a tip, extending through said first portion of said lateral bore with said tip residing within said longitudinal bore; and
    a source of air periodically delivered through said nozzle whereby said dry flocculant is periodically blown through said second portion of said longitudinal bore and out of said manifold exit port.

3. The waste water treatment system of claim 1, wherein said agitation stage comprises:
    a base support with an aperture therethrough and a top and bottom surface;
    a cylindrical housing having an outer wall and an inner wall concentric thereto, a bottom wall and aperture therethrough and a top edge; said cylindrical housing being resiliently mounted to the top surface of said base support; said cylindrical housing further including an input port proximal to said top edge and a exit port proximal to said bottom wall;
    a helical length of corrugated hose positioned between said outer wall and said inner wall; said helical length of corrugated hose having an entry port and an exit port; said entry port of said helical length of corrugated hose being connected to said input port of said cylindrical housing and said exit port of said length of corrugated hose being connected to said exit port of said cylindrical housing; and
    means for vibrating said cylindrical housing and said helical length of corrugated hose disposed therein.

4. The waste water treatment system of claim 3, wherein said means for vibrating is a motor affixed to the bottom surface of said base support with an axle emanating upwardly from said motor and through said aperture in said base support and through said aperture in said bottom wall of said cylindrical housing; a first offset weight being connected to said axle between said base support and said bottom wall of said cylindrical housing and pointing in a first direction; a second offset weight connected to said axle above said bottom wall of said cylindrical housing and positioned in a second direction different than said first direction.

5. The waste water treatment system of claim 4, wherein said first direction of said first offset weight is 180 degrees from said second direction of said second offset weight.

* * * * *